(12) United States Patent
Yoshioka et al.

(10) Patent No.: US 11,913,175 B2
(45) Date of Patent: Feb. 27, 2024

(54) POLYMER, METHOD FOR PRODUCING SAME, WATER- AND OIL-PROOFING COMPOSITION, ARTICLE, AND WATER- AND OIL-PROOF PAPER

(71) Applicant: AGC Inc., Tokyo (JP)

(72) Inventors: Yuzuka Yoshioka, Tokyo (JP); Motohiro Takemura, Tokyo (JP); Hiroyuki Hara, Tokyo (JP)

(73) Assignee: AGC Inc., Tokyo (JP)

( * ) Notice: Subject to any disclaimer, the term of this patent is extended or adjusted under 35 U.S.C. 154(b) by 235 days.

(21) Appl. No.: 17/474,097

(22) Filed: Sep. 14, 2021

(65) Prior Publication Data

US 2021/0404119 A1    Dec. 30, 2021

Related U.S. Application Data

(63) Continuation of application No. PCT/JP2020/010649, filed on Mar. 11, 2020.

(30) Foreign Application Priority Data

Mar. 27, 2019 (JP) ................. 2019-061569

(51) Int. Cl.
| | | |
|---|---|---|
| *D21H 21/16* | (2006.01) | |
| *C08F 216/06* | (2006.01) | |
| *C08F 218/08* | (2006.01) | |
| *D21H 19/12* | (2006.01) | |

(52) U.S. Cl.
CPC ........... *D21H 21/16* (2013.01); *C08F 216/06* (2013.01); *C08F 218/08* (2013.01); *D21H 19/12* (2013.01); *C08F 2800/10* (2013.01); *C08F 2810/00* (2013.01)

(58) Field of Classification Search
CPC ...... D21H 21/16; D21H 19/12; C08F 216/06; C08F 218/08; C08F 2800/10; C08F 2810/00
USPC ........................................................ 162/225
See application file for complete search history.

(56) References Cited

U.S. PATENT DOCUMENTS

| | | | |
|---|---|---|---|
| 4,668,749 A | 5/1987 | Graun et al. | |
| 4,673,712 A | 6/1987 | Fukui et al. | |

FOREIGN PATENT DOCUMENTS

| | | | |
|---|---|---|---|
| JP | 60-243107 A | 12/1985 | |
| JP | 61-281112 A | 12/1986 | |
| JP | 7-133325 A | 5/1995 | |
| JP | 2013-100493 A | 5/2013 | |
| WO | WO 2005/090423 A1 | 9/2005 | |
| WO | WO 2016/104596 A1 | 6/2016 | |

OTHER PUBLICATIONS

WO 2016/104596,, Tanihara et al., Jun. 2016, machine translation.*
Demarteau Jeremy et al., "Controlled Synthesis of Fluorinated Copolymers via Cobalt-Mediated Radical Copolymerization of Perfluorohexylethylene and Vinyl Acetate", Macromolecules, vol. 50, XP-055930399, May 23, 2017, pp. 3750-3760.
Database CA [Online]. Chemical Abs Racts Service, Columbus, OH IIO, US; Arai, Kyotaka: "Fluorine-containing copolymers comprising". XP-002806823, retrieved from STN Database accession No. 1995:741270; & JP H07 133325 A (Asahi Glass Co Ltd, May 23, 1995, 2 pages.
International Search Report dated Jun. 2, 2020 in PCT/JP2020/010649, filed Mar. 11, 2020, 2 pages.

* cited by examiner

*Primary Examiner* — Mark Halpern
(74) *Attorney, Agent, or Firm* — Oblon, McClelland, Maier & Neustadt, L.L.P.

(57) ABSTRACT

To provide a polymer which can provide a water- and oil-proof paper with excellent water and oil resistance. A polymer comprising the following units a, and at least the following units b among the following units b and the following units c, wherein the ratio of units a to all the units in the polymer is from 28 to 70 mol %, the total ratio of units b and units c to all the units in the polymer is from 30 to 72 mol %, and the ratio of units b to the sum of units b and units c is at least 45 mol %:
  units a: units represented by —($CH_2$—$CHR^f$)— (wherein $R^f$ is a $C_{1-8}$ perfluoroalkyl group),
  units b: units represented by —($CH_2$—$CH(OH)$)—,
  units c: units represented by —($CH_2$—$CH(OC(=O)R)$)— (wherein R is a $C_{1-4}$ alkyl group).

8 Claims, No Drawings

POLYMER, METHOD FOR PRODUCING SAME, WATER- AND OIL-PROOFING COMPOSITION, ARTICLE, AND WATER- AND OIL-PROOF PAPER

TECHNICAL FIELD

The present invention relates to a polymer, a method for producing the polymer, a water- and oil-proofing composition, an article, and water- and oil-proof paper.

BACKGROUND ART

Some water- and oil-proofing compositions are known to impart water and oil resistance to substrates such as paper. Water- and oil-proof paper can be obtained by treating pulp or paper with water- and oil-proofing compositions. Water- and oil-proofing compositions are used in treatment of pulp or paper, for example, by impregnating paper with a water- and oil-proofing composition (external addition), or by forming a pulp slurry containing a water- and oil-proofing composition into paper sheet (internal addition).

Patent Document 1 describes a water- and oil-proofing composition in the form of a dispersion of a fluorinated copolymer in an aqueous medium. The fluorinated copolymer in Patent Document 1 comprises from 60 to 98 mass % of units based on a monomer having a $C_6$ or lower perfluoroalkyl group, from 1 to 20 mass % of units based on a monomer having an oxyalkylene group and from 1 to 30% by mass of units based on a monomer having dialkylamino group.

The fluorinated copolymer of Patent Document 1, however, uses (meth)acrylate monomers having an ester linkage which easily breaks upon alkaline hydrolysis or UV photolysis. Therefore, the fluorinated copolymer can suffer loss of perfluoroalkyl groups, which leads to lower water and oil resistance.

On the other hand, the following fluorinated copolymers are known as fluorinated copolymers that do not comprise units based on a (meth)acrylate having a perfluoroalkyl group.

(1) A fluorinated copolymer comprising (perfluoroalkyl) vinyl units, vinyl acetate units and vinyl alcohol units (Patent Document 2).

(2) A fluorinated copolymer comprising (perfluoroalkyl) vinyl units and vinyl acetate units (Patent Document 3 to 4).

PRIOR ART DOCUMENTS

Patent Documents

Patent Document 1: WO 2005/090423
Patent Document 2: JP-A-S60-243107
Patent Document 3: JP-A-S61-281112
Patent Document 4: JP-A-H7-133325

DISCLOSURE OF INVENTION

Technical Problem

However, since the fluorinated copolymer of Patent Document 2 is low in the content of (perfluoroalkyl)vinyl units and is soluble in water, treatment with a composition comprising the fluorinated copolymer cannot impart sufficient water and oil resistance to substrates.

Although the fluorinated copolymers of Patent Document 3 and Patent Document 4 are high in the content of (perfluoroalkyl)vinyl units, treatments with compositions comprising these fluorinated copolymers cannot impart sufficient water resistance and oil resistance to substrates.

The present invention provides a polymer soluble or dispersible in a liquid medium which can provide water- and oil-proof paper with excellent water and oil resistance, a method for its production, a water- and oil-proofing composition which can provide water- and oil-proof paper with excellent water and oil resistance, and article and water- and oil-proof paper with excellent water and oil resistance.

Solution to Problem

The present invention provides the following.

<1> A polymer comprising the following units a, and at least the following units b among the following units b and the following units c, wherein the ratio of units a to all the units in the polymer is from 28 to 70 mol %, the total ratio of units b and units c to all the units in the polymer is from 30 to 72 mol %, and the ratio of units b to the sum of units b and units c is at least 45 mol %:

units a: units represented by the following formula 1

$$-(CH_2-CHR^f)-  \qquad \text{formula 1}$$

wherein $R^f$ is a $C_1$-8 perfluoroalkyl group, units b: units represented by the following formula 2

$$-(CH_2-CH(OH))-  \qquad \text{formula 2}$$

units c: units represented by the following formula 3

$$-(CH_2-CH(OC(=O)R))-  \qquad \text{formula 3}$$

wherein R is a $C_1$-4 alkyl group.

<2> The polymer according to <1>, wherein the molar ratio of units a to the sum of units a and units b is from 20 to 70 mol %.

<3> The polymer according to <1> or <2>, which has a number average molecular weight of at least 9,000.

<4> A method for producing a polymer, which comprises polymerizing a monomer component comprising from 28 to 70 mol % of the following monomer a and from 30 to 72 mol % of the following monomer c, relative to the monomer component, in the presence of a polymerization initiator to produce a polymer comprising units based on the monomer a and units based on the monomer c, and saponifying the units based on the monomer c to a saponification degree of at least 45 mol %.

monomer a: a compound represented by the following formula 4

$$CH_2=CH-R^f \qquad \text{formula 4}$$

wherein $R^f$ is a $C_{1-8}$ perfluoroalkyl group, monomer c: a compound represented by the following formula 5

$$CH_2=CH-OC(=O)R \qquad \text{formula 5}$$

wherein R is a $C_{1-4}$ alkyl group.

<5> The method for producing a polymer according to <4>, wherein the monomer component is polymerized in the presence of an emulsifier to obtain an emulsion comprising the resulting polymer.

<6> The method for producing a polymer according to <5>, wherein the polymer is collected from the emulsion, and the collected polymer is saponified.

<7> The method for producing a polymer according to <6>, wherein the collected polymer is purified before saponification.

<8> The method for producing a polymer according to any one of <4> to <7>, wherein the saponification of units based on the monomer c is carried out in the presence of a fluorine-containing medium.
<9> A water- and oil-proofing composition comprising the polymer as defined in any one of <1> to <3> and a liquid medium.
<10> The water- and oil-proofing composition according to <9>, which is used for paper.
<11> An article treated with the water- and oil-proofing composition as defined in <9>.
<12> Water- and oil-proof paper comprising the polymer as defined in any one of <1> to <3>.
<13> The water- and oil-proof paper according to <12>, having a fluorine content of from 0.01 to 2.0 g/m$^2$.

Advantageous Effects of Invention

The polymer of the present invention is soluble or dispersible in a liquid medium and can provide water- and oil-proof paper having excellent water and oil resistance.

The method for producing a polymer of the present invention can produce a polymer soluble or dispersible in a liquid medium which can provide water- and oil-proof paper having excellent water and oil resistance.

The water- and oil-proofing composition of the present invention can provide water- and oil-proof paper having excellent water and oil resistance.

The article of the present invention has excellent water and oil resistance.

The water- and oil-proof paper of the present invention has excellent water and oil resistance.

DESCRIPTION OF EMBODIMENTS

The terms used in the present invention have the following meanings and definitions.

A "unit based on a monomer" is a generic term for an atomic group derived from 1 molecule of the monomer by polymerization directly, or by polymerization and subsequent partial chemical modification.

A "(meth)acrylate" is a generic term for an acrylate and a methacrylate. Similarly, a "(meth)acryloyloxy group" is a generic term for an acryloyloxy group and a methacryloyloxy group.

A solid content is calculated as solid mass/sample mass× 100, wherein the sample mass is the mass of a sample before heating, and the solid mass is the mass of the sample after 4 hours of drying at 120° C. in a convection dryer.

The number average molecular weight (hereinafter referred to as "Mn") and mass average molecular weight (hereinafter referred to as "Mw") of a polymer are polymethyl methacrylate equivalent molecular weights measured by gel permeation chromatography (hereinafter referred to as "GPC") from a calibration curve obtained using polymethyl methacrylate standards.

<Polymer>

The polymer of the present invention (hereinafter referred to as "polymer A") comprises units a and units b.

The polymer A may further comprise units c.

The polymer A may further comprise additional units (hereinafter referred to as "units d").

units a: units represented by the following formula 1

—(CH$_2$—CHR$^f$)—      formula 1 wherein R$^f$ is a C$_{1-8}$ perfluoroalkyl group,
units b: units represented by the following formula 2

—(CH$_2$—CH(OH))—      formula 2 units c: units represented by the following formula 3

—(CH$_2$—CH(OC(=O)R))—      formula 3 wherein R is a C$_{1-4}$ alkyl group.

R$^f$ in units a preferably has from 4 to 6 carbon atoms, particularly preferably 6 carbon atoms, in order to produce water- and oil-proof paper with higher water and oil resistance by treatment with a composition comprising the polymer A.

R$^f$ may be linear or branched, and is preferably linear.

As R$^f$, CF$_3$, CF$_2$CF$_3$, CF(CF$_3$)$_2$, CF$_2$CF$_2$CF$_2$CF$_3$ and CF$_2$CF$_2$CF$_2$CF$_2$CF$_2$CF$_3$ are preferred, CF$_3$, CF$_2$CF$_3$, CF$_2$CF$_2$CF$_2$CF$_3$ and CF$_2$CF$_2$CF$_2$CF$_2$CF$_2$CF$_3$ are more preferred, and CF$_2$CF$_2$CF$_2$CF$_3$ and CF$_2$CF$_2$CF$_2$CF$_2$CF$_2$CF$_3$ are further preferred.

Units a are typically based on a monomer a.

monomer a: a compound represented by the following formula 4

CH$_2$=CH—R$^f$      formula 4 wherein R$^f$ is a C$_{1-8}$ perfluoroalkyl group.

Two or more monomers a may be used in combination.

R in units c preferably has from 1 to 2 carbon atoms, particularly preferably 1 carbon atom, in order to produce water- and oil-proof paper with higher water and oil resistance by treatment with a composition comprising the polymer A. Namely, R is particularly preferably a methyl group.

Units c are typically based on a monomer c.

monomer c: a compound represented by the following formula 5

CH$_2$=CH—OC(=O)R      formula 5 wherein R is a C$_{1-4}$ alkyl group.

The monomer c is a vinyl ester of a carboxylic acid having a C$_{1-4}$ alkyl group. As the monomer c, vinyl acetate, vinyl propionate, vinyl butyrate and vinyl pivalate may, for example, be mentioned.

Two or more monomers c may be used in combination.

Units d are units based on an additional monomer (hereinafter referred to as a "monomer d") copolymerizable with a monomer a and a monomer c.

The monomer d may be a compound having two or more polymerizable carbon-carbon double bonds. The number of polymerizable carbon-carbon double bonds in the monomer d is preferably from 1 to 3, more preferably 1 or 2, particularly preferably 1.

The monomer d is preferably a compound having a vinyl group or an allyl group, in view of easy copolymerization with the monomer a and the monomer c.

The monomer d may be a vinyl ester of a C$_8$ or higher carboxylic acid, an allyl carboxylate, a vinyl ether, an allyl ether, a vinyl halide, an olefin, a (meth)acrylate, a (meth)acrylamide or a haloolefin other than vinyl halides, but is not limited thereto.

Vinyl esters of a C$_8$ or higher carboxylic acid include, for example, vinyl caproate, vinyl caprylate, vinyl caprate, vinyl laurate, vinyl myristate, vinyl palmitate, vinyl stearate, vinyl octylate, vinyl monochloroacetate, divinyl adipate, vinyl methacrylate, vinyl crotonate and vinyl cinnamate.

Allyl carboxylates include, for example, allyl acetate and diallyl adipate.

Vinyl ethers include, for example, methyl vinyl ether, ethyl vinyl ether, n-butyl vinyl ether, iso-butyl vinyl ether, tert-butyl vinyl ether, 4-hydroxybutyl vinyl ether, stearyl vinyl ether, chloromethyl vinyl ether, 2-chloroethyl vinyl ether, chloropropyl vinyl ether, cyclohexyl vinyl ether, ethylene glycol monovinyl ether and diethylene glycol monovinyl ether.

Allyl ethers include, for example, allyl ethyl ether, diallyl ether and 1,3-diallyloxy-2-propanol.

Vinyl halides include, for example, vinyl chloride and vinyl fluoride.

Olefins include, for example, ethylene and propylene.

(Meth)acrylates include, for example, alkyl (meth)acrylates, hydroxyalkyl (meth)acrylates, aromatic (meth)acrylates, alicyclic (meth)acrylates and (meth)acrylic acid.

Alkyl (meth)acrylates include, for example, methyl (meth)acrylate, n-butyl (meth)acrylate, t-butyl (meth)acrylate, lauryl (meth)acrylate and stearyl (meth)acrylate.

Hydroxyalkyl (meth)acrylates include, for example, 2-hydroxyethyl (meth)acrylate, 2-hydroxypropyl (meth)acrylate, 2-hydroxybutyl (meth)acrylate, 4-hydroxybutyl (meth)acrylate, polyoxyethylene glycol mono(meth)acrylate, polyoxypropylene glycol mono(meth)acrylate and 2-hydroxy-3-acryloyloxypropyl (meth)acrylate.

Aromatic (meth)acrylates include, for example, phenyl (meth)acrylate, benzyl (meth)acrylate and pentafluorophenyl (meth)acrylate.

Alicyclic (meth)acrylates include, for example, cyclohexyl (meth)acrylate and isobornyl (meth)acrylate.

Other (meth)acrylates not listed above include, for example, N,N-dimethylaminoethyl (meth)acrylate, N,N-diethylaminoethyl (meth)acrylate, N,N-diisopropylaminoethyl (meth)acrylate, N,N-dimethylaminopropyl (meth)acrylate and N,N-diethylaminopropyl (meth)acrylate.

(Meth)acrylamides include, for example, alkyl(meth)acrylamides, hydroxyalkyl(meth)acrylamides and (meth)acrylamides having a heterocyclic structure containing the amide nitrogen atom.

Alkyl(meth)acrylamides include, for example, N-methyl (meth)acrylamide, N,N-dimethyl(meth)acrylamide, N,N-diethyl(meth)acrylamide, N-isopropylacrylamide, N,N-diisopropylacrylamide, N-(n-butyl)(meth)acrylamide, N-(t-butyl)(meth)acrylamide, N,N-diethylaminopropyl(meth)acrylamide, N-lauryl(meth)acrylamide, N-stearyl(meth)acrylamide, N-behenyl(meth)acrylamide and N,N-dimethylaminoethyl(meth)acrylamide.

Hydroxyalkyl(meth)acrylamides include, for example, N-hydroxymethyl(meth)acrylamide, N-(2-hydroxyethyl)(meth)acrylamide and N-(4-hydroxybutyl)(meth)acrylamide.

(Meth)acrylamides having a heterocyclic structure containing the amide nitrogen atom include, for example, N-(meth)acryloylmorpholine and N-(meth)acryloylpiperidine.

Haloolefins other than vinyl halides include, for example, vinylidene chloride, vinylidene fluoride, tetrafluoroethylene, trifluorochloroethylene, $CF_2=CFOCF_3$, $CF_2=CFOCF_2CF_3$, $CF_2=CFOCF_2CF_2CF_3$, $CF_2=CFOCF_2CF_2CF_2CF_3$ and $CF_2=CFOCF_2CF(CF_3)OCF_2CF_2CF_3$.

Other examples of the monomer d include, but are not limited to, N-vinylpyrrolidone, N-vinyl-ε-caprolactam and ethyl vinyl sulfide.

The ratio of units a to all the units in the polymer A is from 28 to 70 mol %, preferably from 30 to 45 mol %, more preferably from 32 to 40 mol %. If the ratio of units a is not lower than the lower limit of the above-mentioned range, the polymer A is obtained by polymerization of a monomer component with a high conversion rate of the monomer component and a high molecular weight, and is likely to be soluble in an organic solvent despite the high ratio of units b to the sum of units b and units c. Further, a composition comprising such a polymer A can provide water- and oil-proof paper having high water and oil resistance. If the ratio of units a is not higher than the upper limit of the above-mentioned range, the polymer A is obtained with a high conversion rate and a high molecular weight.

The total ratio of units b and units c to all the units in the polymer A is from 30 to 72 mol %, preferably from 35 to 70 mol %, more preferably from 40 to 68 mol %. If the total ratio of units b and c is not lower than the lower limit of the above-mentioned range, the polymer A is obtained with a high conversion rate of the monomer component and a high molecular weight. If the total ratio of units b and c is not higher than the upper limit of the above-mentioned range, the polymer A is likely to be soluble in an organic solvent despite the high ratio of units b to the sum of units b and units c, and a composition comprising such a polymer A can provide water- and oil-proof paper having high water and oil resistance.

The ratio of units b to the sum of units b and units c is at least 45 mol %, preferably at least 75 mol %, more preferably at least 95 mol %, and may be 100 mol %. When the ratio of units b to the sum of units b and units c is not lower than the above-mentioned lower limit, the polymer A can provide water- and oil-proof paper having high water and oil resistance.

Units b typically result from saponification of units c, and the ratio of units b to the sum of units b and units c corresponds to the saponification degree.

The molar ratio of units a to the sum of units a and units b is preferably from 20 to 70 mol %, more preferably from 25 to 45 mol %, further preferably form 30 to 40 mol %. When it is within the above-mentioned range, the polymer A is easily soluble in an organic solvent.

The total ratio of units a, units b and units c to all the units in the polymer A is preferably at least 70 mass %, more preferably at least 80 mass %, and may be 100 mass %. If the total ratio of units a, units b and units c to all the units in the polymer A is within the above-mentioned range, the polymer A is obtained with a high conversion rate and a high molecular weight. A composition comprising such a polymer A can provide water- and oil-proof paper having high water and oil resistance.

The ratios of the respective units can be determined, for example, by $^1$H-NMR or $^{13}$C-NMR analysis.

The Mn of the polymer A is preferably at least 9,000, more preferably at least 10,000, further preferably at least 11,000. The Mn of the polymer A is preferably at most 100,000, more preferably at most 80,000, further preferably at most 50,000. When the Mn of the polymer A is not lower than the lower limit of the above-mentioned range, a composition comprising the polymer A can provide water- and oil-proof paper having higher water and oil resistance. When the Mn of the polymer A is not higher than the upper limit of the above-mentioned range, the polymer A is more soluble in an organic solvent and can give a less viscous solution.

The Mn of the polymer A is preferably from 9,000 to 100,000, more preferably from 10,000 to 80,000, more preferably from 11,000 to 50,000. When the Mn of the polymer A is within the above-mentioned range, a composition comprising the polymer A can provide water- and oil-proof paper having higher water and oil resistance.

The Mw of the polymer A is preferably at least 9,000, more preferably at least 15,000, further preferably at least 20,000. The Mw of the polymer A is preferably at most 150,000, more preferably at most 120,000, further preferably at most 100,000. When the Mw of the polymer A is not lower than the lower limit of the above-mentioned range, a composition comprising the polymer A can provide waterand oil-proof paper having higher water and oil resistance. When the Mw of the polymer A is not higher than the upper limit of the above-mentioned range, the polymer A is more soluble in an organic solvent and can give a less viscous solution.

The Mw of the polymer A is preferably from 9,000 to 150,000, more preferably from 15,000 to 120,000, further preferably from 20,000 to 100,000. When the Mw of the polymer A is within the above-mentioned range, a composition comprising the polymer A can provide water- and oil-proof paper having higher water and oil resistance.

The polymer A preferably comprises no molecules having molecular weights of 1,000 or less, or comprises, if any, at most 1%, relative to the entire polymer A, of molecules having molecular weights of 1,000 or less. The polymer A more preferably comprises no molecules having molecular weights of 1,000 or less.

When the polymer comprises no molecules having molecular weights of 1,000 or less, or comprises molecules having molecular weights of 1,000 or less in a ratio with the above-mentioned range, a composition comprising the polymer A can provide water- and oil-proof paper having higher water and oil resistance.

The ratio of molecules having molecular weights of 1,000 or less in the polymer A can be calculated as the ratio (%) of the area of peaks attributed to molecules having molecular weights of 1,000 or less to the total peak area in the chart obtained by determination of the molecular weight of the polymer A by GPC.

(Mechanism)

As described above, the polymer A comprises units a and at least units b among units b and units c, the ratio of units a to all the units in the polymer is from 28 to 70 mol %, the total ratio of units b and units c to all the units in the polymer is from 30 to 72 mol %, and the ratio of units b to the sum of units b and units c is at least 45 mol %. Therefore, the polymer A is soluble or dispersible in a liquid medium. A composition comprising the polymer A can provide water- and oil-proof paper having high water and oil resistance.

<Method for Producing Polymer>

The polymer A can be produced, for example, by the following method.

The polymer A can be produced by polymerizing a monomer component comprising from 28 to 70 mol % of the following monomer a and from 30 to 72 mol % of the following monomer c, relative to the monomer component, in the presence of a polymerization initiator to produce a polymer (hereinafter referred to as a "polymer B") comprising units based on the monomer a and units based on the monomer c, and saponifying the units based on the monomer c to units b to a saponification degree of at least 45 mol %. The units c may be converted to units b entirely or partly.

monomer a: a compound represented by the following formula 4

$CH_2=CH-R^f$            formula 4 monomer c: a compound represented by the following formula 5

$CH_2=CH-OC(=O)R$            formula 5

$R^f$ and R are the same as defined previously.

The monomer component may further comprise an additional monomer.

The ratio of a monomer a to the entire monomer component is from 28 to 70 mol %, preferably from 30 to 45 mol %, more preferably from 32 to 40 mol %. When the ratio of a monomer a is not lower than the lower limit of the above-mentioned range, the monomer component polymerizes into a polymer B having a high molecular weight with a high conversion rate, and the polymer A is likely to be soluble in an organic solvent despite the high ratio of units b to the sum of units b and units c. A composition comprising the polymer A can provide water- and oil-proof paper having high water and oil resistance. When the ratio of a monomer a is not higher than the upper limit of the above-mentioned range, the monomer component polymerizes into a polymer B having a high molecular weight at a high conversion rate.

The ratio of a monomer c to the entire polymer component is from 30 to 72 mol %, preferably from 35 to 70 mol %, more preferably from 40 to 68 mol %. When the ratio of a monomer c is not lower than the lower limit of the above-mentioned range, the monomer component polymerizes into a polymer B having a high molecular weight with a high conversion rate. When the ratio of a monomer c is not higher than the upper limit of the above-mentioned range, the polymer A is likely to be soluble in an organic solvent despite the high ratio of units b to the sum of units b and units c, and a composition comprising the polymer A can provide water- and oil-proof paper having high water and oil resistance.

The total ratio of a monomer a and a monomer c to the entire monomer component is preferably at least 70 mass %, more preferably at least 80 mass %, and may be 100 mass %. When it is within the above-mentioned range, the monomer component polymerizes into a polymer B having a high molecular weight with a high conversion rate. Further, a composition comprising the polymer A can provide water- and oil-proof paper having high water and oil resistance.

The polymerization initiator may, for example, be a thermal polymerization initiator, a photopolymerization initiator, a radiation polymerization initiator, a radical polymerization initiator or an ionic polymerization initiator, and is preferably a radical polymerization initiator. As the radical polymerization initiator, for example, an azo type polymerization initiator, a peroxide type polymerization initiator or a redox type initiator is employed depending upon the polymerization temperature. As the radical polymerization initiator, preferred is an azo type polymerization initiator, and more preferred is a salt of an azo type compound.

The amount of the polymerization initiator is preferably from 0.1 to 5 parts by mass, more preferably from 0.1 to 3 parts by mass, per 100 parts by mass of the monomer component.

The polymerization temperature is preferably from 20 to 150° C., more preferably from 40 to 90° C.

At the time of polymerization of a monomer component, a molecular weight-controlling agent may be employed. The molecular weight-controlling agent is preferably an aromatic compound, a mercaptoalcohol, a mercaptocarboxylic acid or an alkyl mercaptan, more preferably a mercaptocarboxylic acid or an alkyl mercaptan. Examples of the molecular weight-controlling agent include mercaptoethanol, mercaptopropionic acid, n-octyl mercaptan, n-dodecyl mercaptan, tert-dodecyl mercaptan, stearyl mercaptan and α-methylstyrene dimer $(CH_2=C(Ph)CH_2C(CH_3)_2Ph$ wherein Ph is a phenyl group).

The amount of the molecular weight-controlling agent is preferably from 0 to 5 parts by mass, more preferably from 0 to 2 parts by mass per 100 parts by mass of the monomer component.

The polymerization method may, for example, be emulsion polymerization, solution polymerization or bulk polymerization. Among them, emulsion polymerization is preferred. Emulsion polymerization of the monomer component does not require a liquid medium other than aqueous media, and the monomer component polymerizes into a polymer B having a high molecular weight with a high conversion rate.

The emulsion polymerization is carried out, for example, in an emulsion comprising the monomer component, an aqueous medium, an emulsifier and a polymerization initiator.

The aqueous medium may be the same aqueous medium as described later for the water- and oil-proofing composition.

The emulsifier may be the same emulsifier as described later for the water- and oil-proofing composition.

The emulsion may be prepared, for example, by emulsifying a mixture of an aqueous medium, a monomer component and an emulsifier in a homogenizer, a high-pressure emulsifying equipment or the like and adding a polymerization initiator. The emulsification temperature for the liquid mixture is, for example, from 20 to 150° C.

The concentration of the monomer component in the emulsion is preferably from 40 to 70 mass %, more preferably from 45 to 60 mass %. When the concentration of the monomer component in the emulsion is within the above-mentioned range, the monomer component polymerizes into a polymer B having a high molecular weight with a high conversion rate.

The amount of the emulsifier in the emulsion is preferably from 1 to 6 parts by mass per 100 parts by mass of the comonomer component. When the amount of the emulsifier is not lower than the lower limit of the above-mentioned range, the emulsion is excellent in dispersion stability. When the amount of the emulsifier is not higher than the upper limit of the above-mentioned range, the emulsifier has little adverse effect on the water and oil resistance of water- and oil-proof paper obtained by using a composition comprising the polymer A.

The monomer component in the emulsion is polymerized, for example, by heating the emulsion to the above-mentioned polymerization temperature. The polymerization time is, for example, from 4 to 120 hours.

The conversion rate of the monomer component to the polymer B at the end of polymerization is preferably at least 80%, more preferably at least 90%. As the conversion rate increases, the molecular weight of the polymer B increases, and a composition comprising the polymer B can provide water- and oil-proof paper having higher water and oil resistance. Because a high conversion rate leads to less damage to polymer performance by remaining monomers and a higher fluorine content of the polymer A, water and oil resistance improves by raising the conversion rate. A conversion rate of 80% or higher can be achieved by optimizing the composition of the emulsion, optimizing the polymerization time, or optimizing the molar ratio (a/c) of the monomer a to the monomer c at the time of polymerization. The molar ratio (a/c) of the monomer a to the monomer c is preferably from 28/72 to 70/30, more preferably from 30/70 to 50/50 in order to raise the conversion rate to 80% or above.

Polymerization of the monomer component in the emulsion yields an emulsion of a polymer B.

It is possible to supply the emulsion to the saponification step directly, or supply the polymer B collected from the emulsion to the saponification step.

The polymer B may be collected by any known method without particular restrictions, for example, by dripping the emulsion into a mixture of 2-butanol and hexane and separating the precipitated polymer B by solid-liquid separation.

The collected polymer B may be purified before supplied to the saponification step.

The polymer B may be purified, for example, by washing with water and a polar solvent other than water.

The temperature of the water is preferably from 20 to 70° C., more preferably from 40 to 60° C.

The amount of the water is, for example, from 6 to 20 times the mass of the polymer B.

The polar solvent other than water is preferably a polar solvent with a relatively low boiling point which does not dissolve or swell the polymer B, more preferably a protonic polar solvent, in view of operability. As the protonic polar solvent, t-butanol or isopropyl alcohol may, for example, be mentioned specifically. The temperature of the polar solvent is, for example, from 20 to 30° C., although there are no particular restrictions.

The amount of the polar solvent other than water is, for example, from 6 to 20 times the mass of the polymer B.

The washing time is, for example, from 5 to 40 minutes.

Saponification of the polymer B converts all or part of the units based on a monomer c to units b.

The polymer B may be saponified by any known method, for example, by contact of the polymer B with an alkali compound in an aqueous medium.

The aqueous medium may be the same as that in the water- and oil-proofing composition, which will be described later. The amount of the aqueous medium is, for example, from 200 to 5,000 parts by mass per 100 parts by mass of the polymer B.

The alkali compound may, for example, be sodium hydroxide or potassium hydroxide. The amount of the alkali compound is, for example, from 0.2 to 35 parts by mass per 100 parts by mass of polymer B, in terms of active ingredient.

When the alkali compound is used in the form of an aqueous solution, the concentration is preferably from 5 to 60 mass %, more preferably from 10 to 50 mass %. The saponification time is adjusted depending on the concentration of the alkali compound.

Saponification of units based on a monomer c is carried out preferably in the presence of a fluorine-containing medium. Because a fluorine-containing medium can disperse the polymer B well, the presence of a fluorine-containing medium ensures efficient saponification of units based on a monomer c.

Units based on a monomer c may be saponified, for example, by mixing the polymer B and a fluorine-containing medium and adding an aqueous medium and an alkali compound to the resulting dispersion.

Examples of the fluorine-containing medium include 1H-tridecafluorohexane (such as ASAHIKLIN AC-2000, hereinafter referred to "AC-2000", manufactured by AGC Inc.), 1,1,1,2,2,3,3,4,4,5,5,6,6-tridecafluorooctane (such as ASAHIKLIN AC-6000, hereinafter referred to "AC-6000", manufactured by AGC Inc.), 1,1,2,2-tetrafluoro-1-(2,2,2-trifluoroethoxy)ethane (such as ASAHIKLIN AE-3000, hereinafter referred to "AE-3000", manufactured by AGC Inc.), dichloropentafluoropropane (such as ASAHIKLIN AK-225, hereinafter referred to "AK-225", manufactured by AGC Inc.), 1,1,1,2,3,4,4,5,5,5-decafluoro-3-methoxy-2-(trifluoromethyl)pentane (such as CYTOP CT-solv100 E, manufactured by AGC Inc.), 1-methoxynonafluorobutane (such as Novec 7100, manufactured by 3M Japan Limited), 1-ethoxynonafluorobutane (such as Novec 7200 manufactured by 3M Japan Limited), 1,1,1,2,3,3-hexafluoro-4-(1,1,2,3,3,3-hexafluoropropoxy)pentane (such as Novec 7600 manufactured by 3M Japan Limited), 2H,3H-perfluoropentane (such as Vertrel XF manufactured by Du pont-Mitsui Fluorochemicals Co., Ltd.), 3,3,4,4,5,5,6,6,7,7,8,8,8-tridecafluoro-1-octanol, 4,4,5,5,6,6,7,7,8,8,9,9-tridecafluoro-1-nonanol, hexafluorobenzene, hexafluoro-2-propanol, 2,2,3,3,4,4,5,5-octafluoro-1-pentanol and 1H,1H,7H-dodecafluoro-1-heptanol.

The reaction temperature for the saponification of units based on a monomer c is preferably from 5 to 80° C., more preferably from 20 to 70° C. The reaction time is, for example, from 5 minutes to 48 hours, or preferably from 30 minutes to 30 hours, although it is set according to the desired saponification degree and can vary depending on the reaction temperature.

The reaction is terminated, for example, by neutralization of the alkali compound or washing away the alkali compound with an aqueous medium.

After the reaction, the polymer A is collected from the reaction solution by removing the aqueous medium or the like, if necessary.

The saponification degree is at least 45 mol %, preferably at least 75 mol %, more preferably at least 95 mol %, and may be 100 mol %. When the saponification degree is not lower than the above-mentioned lower limit, a composition comprising the polymer A can provide water- and oil-proof paper having high water and oil resistance.

<Water- and Oil-Proofing Composition>

The water- and oil-proofing composition of the present invention (hereinafter referred to as "the present composition") comprises a polymer A and a liquid medium.

The liquid medium may be an aqueous medium, a non-aqueous medium or a mixed medium comprising a non-aqueous medium and a water-soluble organic solvent.

When the liquid medium is an aqueous medium, the present composition is preferably a polymer dispersion comprising a polymer A, an aqueous medium and an emulsifier.

When the liquid medium is a non-aqueous medium or a mixed medium, the present composition is preferably a polymer solution comprising a polymer A, and a non-aqueous medium or a mixed medium, and may comprise an emulsifier. A polymer solution generally comprises an emulsifier in an amount of at most 0.3 part by mass per 100 parts by mass of the polymer A.

The present composition means both a dispersion obtained by the method of the present invention for producing a polymer A, and a dispersion obtained by diluting the dispersion before treatment of a substrate.

The present composition may comprise other components, if necessary.

(Aqueous Medium)

As the aqueous medium, water or a mixture of water and a water-miscible organic solvent may be mentioned.

A water-miscible organic solvent is an organic solvent which can be mixed with water in any ratio. The water-miscible organic solvent is preferably at least one species selected from the group consisting of alcohols (other than ether alcohols), ether alcohols and aprotic polar solvents. As the alcohols, t-butanol and propylene glycol may, for example, be mentioned. As the ether alcohols, 3-methoxymethylbutanol, dipropylene glycol, dipropylene glycol monomethyl ether and tripropylene glycol may, for example, be mentioned. As the aprotic polar solvents, N,N-dimethylformamide, dimethyl sulfoxide, tetrahydrofuran (hereinafter referred to as "THF"), acetonitrile, and acetone may, for example, be mentioned. When the liquid medium is an aqueous medium, the water-miscible organic solvent in the aqueous medium is preferably an ether alcohol, more preferably dipropylene glycol, tripropylene glycol or dipropylene glycol monomethyl ether, because the resulting aqueous medium shows high compatibility with the polymer A and thereby facilitates formation of a uniform coating on a substrate.

The amount of a water-miscible organic solvent, if present, in the aqueous medium is preferably from 1 to 80 parts by mass, more preferably from 10 to 60 parts by mass, per 100 parts by mass of water.

(Non-Aqueous Medium)

A non-aqueous medium is a liquid medium which does not contain the above-mentioned aqueous medium and is generally an organic solvent other than water-miscible organic solvents. The non-aqueous organic medium may be any medium which can dissolve a polymer A without particular restrictions and may, for example, be a ketone other than the above-mentioned water-miscible organic solvents, a compound having an amide linkage other than the above-mentioned water-miscible organic solvents, a compound having an ether linkage and no hydroxy groups other than the above-mentioned water-miscible organic solvent or a fluorine-containing medium.

The ketone other than the above-mentioned water-miscible organic solvents may, for example, be methyl ethyl ketone or methyl isobutyl ketone.

The compound having an amide linkage may, for example, be dimethylacetamide, 3-methoxydimethylpropanamide, 3-butoxydimethylpropanamide or methylpyrrolidone.

The compound having an ether linkage and no hydroxy groups other than the above-mentioned water-miscible organic solvent may, for example, be diethyl ether, dipropylene glycol dimethyl ether, triethylene glycol dimethyl ether or tetraethylene glycol dimethyl ether.

The fluorine-containing medium may be any of those mentioned above in the section, Method for Producing Polymer.

Two or more non-aqueous media may be used.

(Mixed Medium)

The mixed medium is a medium which can dissolve a polymer A and comprises a non-aqueous medium and a water-soluble organic solvent miscible with the non-aqueous medium.

The non-aqueous medium in the mixed medium may be any of those mentioned above and is preferably a fluorine-containing compound or a ketone compound mentioned above. The fluorine-containing medium in the mixed medium is preferably AK-225, AE-3000, AC-6000 or AC-2000. The ketone compound is preferably methyl isobutyl ketone.

The water-soluble organic solvent in the mixed medium may be any of those mentioned above for the aqueous medium and is preferably an aprotic polar solvent, further preferably THF, acetone or N,N-dimethylformamide.

The mixed medium is preferably a mixture of a fluorine-containing medium and an aprotic polar solvent or a mixture of a fluorine-containing medium and a ketone compound, more preferably a mixture of AK-225 and THF.

The ratio of a fluorine-containing medium in the mixed medium is preferably from 30 to 70 vol %, more preferably from 40 to 60 vol %, relative to the total volume of the mixed medium. A mixed medium comprising a fluorine-containing medium in a ratio within the above-mentioned range is favorable for easy dissolution of a polymer A. The above-mentioned ratio is at room temperature (25±5° C.).

(Emulsifier)

An emulsifier is a surfactant, which has both a hydrophilic section and a hydrophobic section.

The emulsifier may be an anionic emulsifier, a nonionic emulsifier, a cationic emulsifier or an amphoteric emulsifier. The emulsifier is preferably a fluorine-free emulsifier having no fluorine atoms.

As the emulsifier, it is preferred to use a nonionic emulsifier singly, to use a nonionic emulsifier in combination with a cationic or amphoteric emulsifier, or to use an anionic emulsifier singly, and combined use of a nonionic emulsifier and a cationic emulsifier is more preferred.

The ratio of a nonionic emulsifier to a cationic emulsifier (nonionic emulsifier/cationic emulsifier) is preferably from 100/0 to 40/60 (mass ratio), more preferably from 97/3 to 40/60 (mass ratio).

Combined use of a nonionic emulsifier and a cationic emulsifier can reduce the total amount of emulsifiers to 5 parts by mass or less per 100 parts by mass of the polymer A and hence can reduce the adverse effect of emulsifiers on the water and oil resistance of water- and oil-proof paper obtained by using the present composition.

Examples of nonionic emulsifiers include surfactants s1 to s6 described in paragraphs [0067] to [0095] of JP-A-2009-215370.

The surfactant s1 is a polyoxyalkylene monoalkyl ether, a polyoxyalkylene monoalkenyl ether, a polyoxyalkylene monoalkapolyenyl ether or a polyoxyalkylene monopolyfluoroalkyl ether. As the surfactant s1, polyoxyethylene alkyl ether is preferred.

The surfactant s2 is a compound having at least one carbon-carbon triple bond and at least one hydroxyl group in the molecule. As the surfactant s2, acetylene glycol ethylene oxide adduct is preferred.

The surfactant s3 is a hydroxyl-terminated compound which comprises a polyoxyethylene chain and a polyoxyalkylene chain consisting of at least two $C_3$ or higher oxyalkylene moieties connected in tandem, and is preferably a polymerization product of ethylene oxide and propylene oxide.

As the nonionic surfactant, a single species may be used, and two or more species may be used in combination.

Examples of cationic emulsifiers include surfactant s7 described in paragraphs [0096] to [0100] of JP-A-2009-215370.

The surfactant s7 is a cationic surfactant in the form of a substituted ammonium salt.

The surfactant s7 is preferably an ammonium salt having at least one alkyl group, alkenyl group or hydroxyl-terminated polyoxyalkylene chain on the nitrogen atom, instead of hydrogen atom(s), and is preferably a compound s71 represented by the following formula s71.

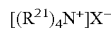   Formula s71 wherein $R^{21}$ is a hydrogen atom, a $C_{1\text{-}22}$ alkyl group, a $C_{2\text{-}22}$ alkenyl group, a $C_{1\text{-}9}$ fluoroalkyl group or a hydroxy-terminated polyoxyalkylene chain, provided that not all of the four $R^{21}$'s, which may be the same or different, are hydrogen atoms, and $X^-$ is a counterion.

$X^-$ is preferably a chlorine ion, an ethyl sulfate ion or an acetate ion.

Examples of the compound s71 include monostearyltrimethylammonium chloride, monostearyldimethylmonoethylammonium ethyl sulfate, mono(stearyl)monomethyldi(polyethylene glycol)ammonium chloride, monofluorohexyltrimethylammonium chloride, di(beef tallow alkyl)dimethylammonium chloride and dimethylmonococonutamine acetate.

As the cationic surfactant, a single species may be used, and two or more species may be used in combination.

Examples of amphoteric emulsifiers include surfactant s8 described in paragraphs [0101] to [0102] of JP-A-2009-215370. As the surfactant s8, a single species may be used, or two or more species may be used in combination.

The surfactant s8 is alanine, imidazolinium betaine, amidobetaine or betaine acetate.

(Additional Components)

Additional components may be added to a dispersion obtained by the method of the present invention for producing a polymer A or to a dispersion obtained by diluting such a dispersion.

Examples of additional components to be added to a dispersion obtained by the method of the present invention for producing a polymer A include a resin other than the polymer A, glue, a crosslinking agent, a catalyst, an organic filler, an inorganic filler, a supporting agent, a moisturizing agent, a flocculant, a buffer, a bactericide, a biocide, a fungicide, a sequestering agent, a hydrophobizing agent, a surfactant, a defoamer and a volatile organic solvent.

Examples of additional components to be added to a diluted dispersion include additives to be used in the external addition process described later, such as a paper strength additive (such as starches and resins), a sizing agent, a penetrant, a defoamer, a chelating agent, a dye, a pigment, a binder, an acid, an alkali, an alginate and aluminum sulfate, and additives to be used in the internal addition process described later, such as a coagulant, a retention aid, a sizing agent, a paper strength agent, a pigment, a dye and a pH adjuster.

Two or more additional components may be used.

It is possible to add the same component or different components having the same function to a dispersion obtained by the method for producing a polymer A, before and after dilution of the dispersion. Examples of the additional components are not limited to those mentioned above.

Incorporation of a crosslinking agent into the present composition is likely to improve adhesion to a substrate. As the crosslinking agent, preferred is an isocyanate crosslinking agent, a methylol crosslinking agent, a carbodiimide crosslinking agent or an oxazoline crosslinking agent.

As the isocyanate crosslinking agents, for example, aromatic blocked isocyanate crosslinking agents, aliphatic blocked isocyanate crosslinking agents, aromatic unblocked isocyanate crosslinking agents and aliphatic unblocked isocyanate crosslinking agents may be mentioned. Isocyanate crosslinking agents which are in the form of an aqueous dispersion containing a surfactant as an emulsifier or inherently water-dispersible isocyanate crosslinking agents having a hydrophilic group are preferred.

Examples of methylol crosslinking agents include condensates or precondensates of urea or melamine with formaldehyde, methylol dihydroxyethylene urea and derivatives thereof, methylol ethylene urea, methylol propylene urea, methylol triazone, dicyandiamide-formaldehyde condensates, methylol carbamate, methylol (meth)acrylamide and polymers thereof.

Carbodiimide crosslinking agents are polymers having a carbodiimide group in the molecule and are highly reactive with carboxy groups, amino groups and active hydrogen groups on a substrate or the like.

Oxazoline crosslinking agents are polymers having an oxazoline group in the molecule and are highly reactive with carboxyl groups on a substrate As other crosslinking agents, for examples, divinyl sulfone, polyamides and their cationic derivatives, polyamines and their cationic derivatives, epoxy derivatives such as diglycidyl glycerol, halide derivatives such as (epoxy-2,3-propyl)trimethylammonium chloride and N-methyl-N-(epoxy-2,3-propyl)morpholinium chloride, ethylene glycol chloromethyl ether pyridinium salt, polyamine-polyimide-epichlorohydrin resins, polyvinyl alcohol and its derivatives, polyacrylamide and its derivative and glyoxal resin anticrease agents.

When the present composition comprises a methylol crosslinking agent or a glyoxal resin anticrease agent, it preferably comprises a catalyst as an additive. As the catalyst, an inorganic amine salt or an organic amine salt is preferred. The inorganic amine salt may, for example, be ammonium chloride. The organic amine salt may, for example, be an amino alcohol hydrochloride or semicarbazide hydrochloride. The amino alcohol hydrochloride may, for example, be monoethanolamine hydrochloride, diethanolamine hydrochloride, triethanolamine hydrochloride or 2-amino-2-methylpropanol hydrochloride.

(Ratios of Respective Components)

The solid content of the present composition is preferably from 25 to 70 mass %, more preferably from 30 to 60 mass % when the polymer A is produced by the method of the present invention.

The emulsifier content of the present composition is preferably from 1 to 6 parts by mass per 100 parts by mass of the polymer A when the polymer A is produced by the method of the present invention.

The solid content of the present composition is for example, from 0.1 to 10 mass %, preferably from 0.3 to 5 mass %, more preferably from 0.8 to 3 mass % at the time of treatment of a substrate such as paper.

The concentration of a crosslinking agent in the present composition is preferably from 0.1 to 3 mass % at the time of treatment of a substrate such as paper.

(Mechanism)

As described above, because the present composition comprises a polymer A comprising units a, and at least units b among units b and units c, wherein the ratio of units a to all the units in the polymer is from 28 to 70 mol %, the total ratio of units b and units c to all the units in the polymer is from 30 to 72 mol %, and the ratio of units b to the sum of units b and units c is at least 45 mol %, it can provide water- and oil-proof paper having excellent water and oil resistance. In the present composition, the polymer A is well dissolved or dispersed in the liquid media.

<Article>

The article of the present invention is obtained by treating a substrate with the present composition.

The substrate to be treated with the present composition may, for example, be fibers, woven fabrics, knitted fabrics, nonwoven fabrics, glass, paper, wood, leather, synthetic leather, stone, concrete, ceramics, metals, metal oxides, ceramics, molded resin products, porous resin products and fibrous porous bodies. Porous resin products include, for example, those used as filters. As the materials for porous resin products, polypropylene, polyethylene terephthalate and polytetrafluoroethylene may, for example, be mentioned. As the materials for fibrous porous bodies, glass fibers, cellulose nanofibers, carbon fibers and cellulose acetate fibers may, for example, be mentioned.

The treatment method may, for example, comprise coating a substrate with the present composition by a known coating method or impregnating a substrate with the present composition, followed by drying.

(Mechanism)

The article of the present invention obtained by treatment with the present composition has good water and oil resistance.

<Water- and Oil-Proof Paper>

The water- and oil-proof paper of the present invention comprises a polymer A.

The content of a polymer A is preferably from 0.01 to 3.0 g/m$^2$, more preferably from 0.1 to 1.5 g/m$^2$, in terms of the mass of the polymer A per unit area of the water- and oil-proof paper of the present invention. If the content of the polymer A is not lower than the lower limit of the above-mentioned range, the water- and oil-proof paper of the present invention has higher water and oil resistance. If the content of the polymer A is not higher than the upper limit of the above-mentioned range, the water- and oil-proof paper of the present invention has good permeability to air or steam. The content of the polymer A can be calculated from the fluorine content of the water- and oil-proof paper, as described later in detail in the Examples.

The fluorine content of the water- and oil-proof paper is measured by the combustion-pyrohydrolysis method. The procedure for measurement is described later in the Examples.

The fluorine content is preferably from 0.01 to 2.0 g/m$^2$, more preferably from 0.6 to 1.0 g/m$^2$, in terms of the mass of fluorine atoms per unit area of the water- and oil-proof paper of the present invention. If the fluorine content is not lower than the lower limit of the above-mentioned range, the water- and oil-proof paper of the present invention has higher water and oil resistance. If the fluorine content is not higher than the upper limit of the above-mentioned range, the water- and oil-proof paper of the present invention has good permeability to air or steam.

The water- and oil-proof paper may be produced by coating or impregnating a paper substrate with the present composition (external addition process) or by making a pulp slurry comprising the present composition into paper (internal addition process).

The present composition may be diluted with water or an aqueous medium before use in the external addition process and the internal addition process.

(External Addition Process)

The paper substrate may, for example, be produced by beating a pulp slurry in water, if necessary mixing two or more pulp slurries in a certain ratio, adding some agents, and forming the slurry into a sheet on a wire screen. The paper substrate may be in the form of a continuous long web, in the form of a sheet cut from such a web, or in the form of molded pulp (such as a container) produced by a pulp molding machine.

The basis weight of the paper substrate is, for example, from 10 g/m$^2$ to 500 g/m$^2$.

As examples of raw materials of pulp, wood (such as coniferous wood and deciduous wood); vegetables such as bagasse, rice straw, bamboo, reed and coconut shell; and waste paper may specifically be mentioned. Pulp from wood and vegetable raw materials is called fresh pulp, while pulp from waste paper is called recycled pulp.

Fresh pulp comes in different names depending on the method of production, such as kraft pulp (KP), sulfite pulp (SP), soda pulp, mechanical pulp (MP), thermomechanical pulp (TMP) and chemithermomechanical pulp (CTMP). Fresh pulp may be bleached through one or more bleaching steps, if necessary.

Recycled pulp may be produced by disintegration, cleaning, deinking or bleaching or by a combination thereof.

The paper substrate may contain a sizing agent, a fixing agent, a dry-strength additive, a wet-strength additive, aluminum sulfate, a retention aid, a dye, a pigment, a filler or the like, as long as they do not spoil the effect of the present invention.

The present composition may be applied by coating or impregnation at any stage after sheet forming, at the size press after sheet forming, a wet press and a pre-dryer, or at a coater after the size press.

The present composition may be applied using a coating machine such as a size press machine, a coater or a printing machine. As a size press machine, a two-roll size press machine, a film transfer size press machine, a calender size press machine or the like may be mentioned. As a coater, a roll coater, an air knife coater, a die coater, a blade coater, a bar coater, a bill blade coater, a short dwell blade coater or the like may be mentioned. As a printing machine, a gravure printing machine, a flexographic printing machine, an offset printing machine or the like may be mentioned.

After coating or impregnation with the present composition, the paper substrate is dried. The drying may be carried out by heating or without heating (air drying).

The drying temperature is preferably from 20 to 300° C., more preferably from 20 to 250° C.

(Internal Addition Process)

The pulp slurry is a dispersion of pulp in water.

The pulp is obtained from a similar raw material to those mentioned previously for external addition process. The pulp slurry may be produced disintegrating dry pulp in a disintegrator, or by diluting wet pulp produced by a pulper. A single pulp slurry may be used alone, or two or more pulp slurries may be used after mixed in a certain ratio.

The concentration of pulp in the pulp slurry is preferably from 0.1 to 10 mass %.

The present composition may be added at any stage before supplying the pulp slurry onto the wire screen in a paper machine.

For forming the pulp slurry into a sheet, a paper machine may be used. The paper machine may be any device designed to drain water from the pulp slurry on a wire screen. The paper machine may be a continuous paper machine such as a Fourdrinier paper machine, a batch type pulp molding machine which drains water from a pulp slurry through a wire screen mold to produce a molded product.

(Mechanism)

The water- and oil-proof paper of the present invention is made of pulp or paper treated with the present composition and has good water and oil resistance.

EXAMPLES

The present invention will be described in detail with reference to Examples, but the present invention is not limited thereto.

Ex. 1 to 9 are Examples of the present invention, and Ex. 10 to 27 are Comparative Examples. Room temperature means 25° C.±5° C.

(Solid Content)

A sample (emulsion) was heated at 120° C. in a suction oven (a convection dryer) for 4 hours. The solid content (mass %) was calculated by dividing the mass of the solid obtained after the heating (solid mass) by the mass of the sample before the heating.

(Conversion Rate)

The theoretical solid content of a polymer emulsion obtained in each Example was calculated from the amounts of raw materials used, and the conversion rate from the monomer component to the polymer was calculated from the theoretical solid content and the actual solid content, as the actual value/theoretical value×100. A conversion rate of 90% or higher was rated as A (good), a conversion rate of not lower than 80% and lower than 90% was rated as B (satisfactory), and a conversion rate of lower than 80% was rated as C (unsatisfactory).

(Molecular Weight)

The molecular weights of polymers (FV1) to (FV9), (1 b), (2b), (3b-1) and (3b-2) among the polymers described later were measured as described below. The molecular weights of the other polymers were unable to measure because they were insoluble in the mixed medium described later.

A polymer was dissolved in a mixed medium comprising a fluorine-containing medium (AK-225, manufactured by AGC Inc.)/THF in a volume ratio of 6/4 to make a solution with a solid content of 0.5 mass %, and the solution was passed through a filter having a 0.2 μm pore size to prepare an analytical sample. The number average molecular weight (Mn) and the mass average molecular weight (Mw) were measured by GPC of the analytical sample under the following conditions.

Instrument: HLC-8320 GPC manufactured by Tosoh Corporation

Column: MIXED-C manufactured by Polymer laboratories, 300×7.5 mm 5 μm

Mobile phase: mixed medium comprising AK-225/THF in a ratio of 6/4 (volume ratio)

Flow rate: 1.0 mL/min

Oven temperature: 37° C.

Sample concentration: 1.0 mass %

Injection volume: 50 μL

Detector: RI (refractive index detector)

Standard sample: polymethyl methacrylate (Mn=2,136,000, 955,000, 569,000, 332,800, 121,600, 67,400, 31,110, 13,300, 7,360, 1,950, 1,010, and 550)

(Saponification Degree)

A polymer and its saponification product were dissolved in a mixed medium comprising AK-225 and THF in a volume ratio of 5/5 to about the same concentration, and the resulting solutions were formed into films by removing the medium, which were to be used for measurement of IR spectra by infrared (IR) spectrometry. The film obtained from the polymer before saponification was designated as an unsaponified sample, and the film obtained from the saponification product was designated as a saponified sample. The IR absorption spectrum of each sample was measured using the attenuated total reflectance (ATR) technique. In IR absorption spectra, the C=O stretching vibration in an ester linkage appears as a peak between $1,735$ cm$^{-1}$ and $1,745$ cm$^{-1}$. The saponification degree was calculated as $(1-(Y/X))\times 100$ wherein X is the maximum absorbance between $1,735$ cm$^{-1}$ and $1,745$ cm$^{-1}$ in the IR spectrum of the unsaponified sample, and Y is the maximum absorbance between $1,735$ cm$^{-1}$ and $1,745$ cm$^{-1}$ in the IR spectrum of the saponified sample.

(Fluorine Content of Treated Paper)

The fluorine content of treated paper, namely the amount (g/m$^2$) of fluorine atoms adhering to the treated paper was measured by the combustion-pyrohydrolysis method as described in JP-A-2009-215370. The combustion-pyrohydrolysis method is described in Bunsekikagaku vol. 26, No. 10, pp. 721-723 "Determination of organic fluorine by combustion-pyrohydrolysis method" (published in 1977 by The Japan Society for Analytical Chemistry).

(Polymer Content of Treated Paper)

The polymer content of treated paper, namely the amount ($g/m^2$) of the polymer adhering to the treated paper was calculated from the fluorine content of the polymer and the fluorine content of treated paper. The fluorine content of the polymer was calculated from the amounts of the monomers used to prepare the polymer.

However, in Ex. 13 to 15 and Ex. 25 to 27, the polymer content ($g/m^2$) of treated paper was assumed by subtracting the mass of the paper before treatment from the mass of the treated paper, because the fluorine contents of the treated papers were insubstantial.

(Oil Resistance)

Treated paper was tested for oil resistance by the following method (the kit test) in accordance with TAPPI KIT-559 cm-02, using test solutions (kit reagents) prepared by mixing castor oil, toluene and heptane in the volume ratios shown in Table 1.

Test paper was laid on a flat, clean and black plane, and one droplet of each test solution, in order of decreasing number, was dropped from a height of 13 mm onto the test paper. After 15 seconds, the droplet of the test solution was removed with clean blotting paper, and the surface of the area of the test paper which had been in contact with the test solution was examined with the naked eye. The kit number of the highest numbered test solution that left no stain on the paper was used as the rating for the oil resistance of the paper. A higher number implies better oil resistance. A rating having a decimal place indicates a rating higher than its integer portion by its fraction portion. Oil resistance is preferably at least 5, more preferably at least 7.

(Solubility Test)

The polymers obtained in Preparation Examples (1a), (9a) and (1b) to (8b) described later and ethylene-vinyl alcohol copolymer (EXCEVAL™ RS-2117, manufactured by KURARAY Co., Ltd.) (hereinafter referred to as "EVAL") were tested for solubility in two liquid media: a mixed medium comprising AK-225/THF in a volume ratio of 1/1 and water, as described below.

A sample was prepared by mixing a polymer and a liquid medium to a polymer concentration of 0.2 mass %. The sample was stirred sufficiently and was rated by visual inspection on a scale of "A" for complete dissolution of the polymer, "B" for partial dissolution of the polymer and "C" for no dissolution of the polymer.

TABLE 1

| | Mixing ratio (vol %) | | |
|---|---|---|---|
| No. | Castor oil | Toluene | n-heptane |
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

(Water Resistance)

The stockigt sizing degree (second) of treated paper was measured in accordance with JIS P8122: 2004. A high sizing degree indicates higher water resistance. Sizing degree is preferably at least 5 seconds, particularly preferably at least 10 seconds.

(Monomer a)

C6OLF: $CH_2=CH-CF_2CF_2CF_2CF_2CF_2CF_3$ (manufactured by Tokyo Chemical Industry Co., Ltd.)

(Monomer c)

VAC: vinyl acetate (manufactured by Tokyo Chemical Industry Co., Ltd.)

(Media)

Water: ion-exchanged water

DPG: dipropylene glycol (Emulsifiers)

E430: polyoxyethylene oleyl ether (adduct with about 30 moles of ethylene oxide, EMULGEN 430, manufactured by Kao Corporation)

P204: ethylene oxide-propylene oxide polymer (containing 40 mass % of oxyethylene, Pronon #204, manufactured by NOF Corporation)

AQ18-63: 63 mass % solution of monostearyltrimethylammonium chloride in water and isopropyl alcohol (LIPOQUAD 18-63, manufactured by Lion Specialty Chemicals Co., Ltd.)

SFY485: acetylene glycol ethylene oxide adduct (containing 30 moles of ethylene oxide, SURFYNOL 485, manufactured by Nisshin Chemical Industry Co., Ltd.)

These surfactants were diluted with water to an active ingredient concentration of 10 mass % before use.

(Polymerization Initiator)

VA-061A: liquid mixture comprising 2,2'-azobis[2-(2-imidazolin-2-yl)propane] (VA-061, manufactured by Wako Pure Chemical Industries, Ltd.) and 80 mass % aqueous acetic acid in a mass ratio of 1:1

DBPO: benzoyl peroxide

Preparation Examples (1a) to (6a)

The monomers, media and emulsifiers shown in Table 2 were put in 30 mL vials in the amounts shown in Table 2 to make liquid mixtures. The concentration of each material in Table 2 is expressed on an active ingredient basis. The liquid mixtures were stirred in a homogenizer to obtain emulsions. The emulsions were put in 100 mL ampoules, and the polymerization initiator shown in Table 2 was added in the amounts shown in Table 2. The ampoules were flushed with nitrogen and heated to 45° C., and the monomer components were polymerized for 72 hours to obtain polymer emulsions.

8 g of each polymer emulsion was added dropwise to 25 g of a mixed medium comprising 2-butanol and hexane in a volume ratio of 8/2, and the resulting mixtures were stirred to precipitate solids. The solids were separated by 10 minutes of centrifugation at 3,000 rpm, then stirred with warm water at 40° C. and centrifuged at 3,000 rpm for 10 minutes. The solids were stirred with 25 g of 2-propanol and centrifuged at 3,000 rpm for 10 minutes. After separation from the supernatants, the solids were dried in vacuo to obtain polymers (unsaponified polymers (FV1) to (FV6)).

Preparation Examples (7a) and (8a)

Into a 1 L reactor equipped with a stirrer, a thermometer and a reflux condenser, the monomers, medium and polymerization initiator shown in Table 3 were introduced in the amounts shown in Table 3 to obtain solutions. The concentration of each material in Table 3 is expressed on an active ingredient basis. The solutions were heated to 73° C., and the monomer components were polymerized for 50 minutes.

The reaction mixtures were diluted with 100 g of methanol to a concentration of 80 mass % and maintained at 60° C. The concentrations of the mixtures means the solid polymer contents. As the polymerization proceeded, the reaction mixtures were diluted with methanol stepwise to concentrations of 70 mass %, 60 mass % and 50 mass % for viscosity adjustment. During the polymerization, the temperature was raised to 65° C., and 5 hours after the temperature reached 65° C., the reaction solutions were mixed with 200 g of methanol, and the unreacted VAC was distilled off from the reaction solutions to obtain polymers (unsaponified polymers (FV7) and (FV8)).

Preparation Example (9a)

Into a 200 mL stainless steel autoclave (which withstands pressures of up to 3 MPa) equipped with a stirrer, 79.0 g of t-butyl alcohol, 26.7 g of t-butyl vinyl ether (hereinafter referred to as "TBVE"), 0.48 g of potassium carbonate and 0.46 g of a 70 mass % isooctane solution of t-butyl peroxypivalate were loaded, and the autoclave was purged with pressurized $N_2$ gas several times to expel oxygen from the system. Then, 26.7 g of tetrafluoroethylene (hereinafter referred to as "TFE") was introduced into the autoclave, and the autoclave was heated to 55° C., at which the pressure stood at 1.56 MPa. When the pressure decreased to 1.12 MPa after 7 hours of polymerization, the polymerization was terminated by cooling the autoclave with water and purging unreacted TFE. The resulting polymer solution was poured into methanol to precipitate the polymer, and the polymer was dried in vacuo. The yield of the polymer was 22.0 g, and the conversion rate of the monomers was 41%. From analysis of the polymer by fluorine mass spectrometry, it turned out that the polymer comprised TFE and TBVE in a ratio of 51/49 (mol %). From copolymerizabilities of the monomers, it was calculated that the polymer was virtually an alternating copolymer in structure (with a degree of alternation of 95% or above).

Then, 2.0 g of the polymer, 0.5 mL of concentrated sulfuric acid, 50 mL of ethanol and 1 mL of water were stirred in a 100 mL flask with heating at 90° C., to hydrolyze the t-butyl group in TBVE to a hydroxyl group. After 3 to 4 hours of stirring, the reaction system turned into a uniform solution. The reaction was carried out at 90° C. for 12 hours in total. The resulting reaction solution was added to water dropwise to precipitate the polymer. After washing with water and drying at 40° C. in vacuo, the white polymer (polymer (FV9)) was obtained in a yield 1.42 g. More than 97 mol % of the TBVE used was taken up in polymer (FV9) in the converted form having a hydroxyl group instead of a t-butyl group.

Preparation Examples (1b), (2b), (3b-1), (3b-2) and (4b) to (6b)

Polymers (FV1) to (FV6) obtained in Preparation Examples (1a) to (6a) were saponified under the conditions shown in Table 4 respectively to obtain polymers (1b), (2b), (3b-1), (3b-2), (4b), (5b) and (6b).

1.5 g of unsaponified polymers (FV1) to (FV6) were put in vials, separately, with 22.5 g of a medium (AE-3000, manufactured by AGC Inc.), and the resulting polymer solutions were diluted with 13.5 g of methanol and shaken lightly with 1.5 g of aqueous NaOH having the concentrations shown in Table 4. The solutions were allowed to stand for 3 hours at 50° C. until the reaction proceeded to some extent, and then the solutions were allowed to stand at room temperature for 24 hours until the end of the reaction, except that in Preparation Examples (3b-1) and (3b-2), the solutions were allowed to stand for 45 minutes at 50° C. until the end of the reaction. After the reaction, the medium was distilled off at 40° C. under reduced pressure, and the residues were dried at 40° C. for 1 hour to obtain solids. The solids were washed in water, then recovered by filtration and dried again at 40° C. to obtain polymers (saponified polymers (1 b), (2b), (3b-1), (3b-2), (4b), (5b) and (6b)).

Preparation Examples (7b) and (8b)

Polymers (FV7) and (FV8) obtained in Preparation Examples (7a) and (8a) were saponified under the conditions shown in Table 4 respectively to obtain polymers (7b) and (8b).

50 g of polymers obtained in Preparation Examples (7a) and (8a) were dissolved in 150 g of methanol. The resulting solutions were stirred at 22° C. with 4 g of water and 4 g of 10 mass % NaOH in methanol for about 5 minutes to homogeneity. The resulting alkaline gels were crushed, and 50 minutes after the crushing, the gels were neutralized in 50 g of methanol with 0.6 mL of 70 mass % aqueous acetic acid to terminate the reaction. After the reaction, the medium was distilled off under reduced pressure, and the residues were dried at 40° C. under reduced pressure for 1 hour to obtain solids. The solids were washed in water, recovered by filtration and dried again at 40° C. to obtain polymers (saponified polymers (7b) and (8b)).

Table 2 shows the amounts of monomers, media, emulsifiers and polymerization initiators used and their amounts, the molar ratios of C60LF to VAC fed to the polymerization, the concentrations of the monomer component in the emulsions, the conversion rates to the polymers, and the molecular weights (Mn and Mw) of the polymers in Preparation Examples (1a) to (6a).

Table 3 shows the amounts of monomers, media, emulsifiers and polymerization initiators used and their amounts, the molar ratios of C60LF to VAC fed to the polymerization, the conversion rates to the polymers, and the molecular weights (Mn and Mw) of the polymers in Preparation Examples (7a) and (8a).

Table 4 shows the conditions used for saponification of unsaponified polymers (FV1) to (FV8) to polymers (1 b), (2b), (3b-1), (3b-2) and (4b) to (8b), and the molecular weights (Mn and Mw) of the polymers, unsaponified and saponified, used in Ex. 1 to 27 described later. The molecular weights of polymers (4b) to (8b) and EVAL were not measured because these polymers were insoluble in the AK-225/THF mixed medium. Because polymers (4b) to (7b) were not enough soluble in the mixed medium used in the solubility test or water, the paper test described later was not conducted for them. The results of the solubility test on the polymers are also shown in Table 4.

TABLE 2

| | | Concentration (mass %) | Preparation Example | | | | | |
|---|---|---|---|---|---|---|---|---|
| | | | (1a) | (2a) | (3a) | (4a) | (5a) | (6a) |
| Amount (g) | Monomer C60LF | 100 | 7.06 | 6.43 | 6.48 | 5.55 | 4.83 | 3.18 |
| | VAC | 100 | 2.68 | 3.30 | 3.33 | 4.18 | 4.82 | 6.45 |
| | Medium Water | 100 | 5.89 | 5.90 | 5.89 | 5.89 | 5.06 | 5.05 |
| | DPG | 100 | 1.70 | 1.72 | 1.70 | 1.70 | 1.69 | 1.68 |
| | Emulsifier E430 | 10 | 0.97 | 1.04 | 0.99 | 1.00 | 0.98 | 0.97 |
| | P204 | 10 | 0.49 | 0.49 | 0.48 | 0.50 | 0.49 | 0.47 |
| | AQ18-63 | 10 | 0.24 | 0.25 | 0.27 | 0.28 | 0.24 | 0.26 |
| | SFY485 | 10 | 0 | 0 | 0 | 0 | 1.00 | 0.96 |
| | Polymerization Initiator VA-061A | 10 | 1.01 | 1.03 | 0.99 | 0.97 | 0.96 | 0.98 |
| Molar ratio | C60LF | | 1 | 1 | 1 | 1 | 1 | 1 |
| | VAC | | 1.5 | 2 | 2 | 3 | 4 | 8 |
| Emulsion | Monomer concentration [mass %] | | 48.6 | 48.3 | 48.7 | 48.5 | 48.1 | 48.2 |
| Polymer emulsion | Solid content [mass %] | | 48.0 | 45.8 | 47.1 | 48.0 | 46.8 | 44.9 |
| Polymer | Polymer name | | (FV1) | (FV2) | (FV3) | (FV4) | (FV5) | (FV6) |
| | Conversion rate [%] | | A | A | A | A | A | A |
| | Molecular weight Mn | | 23000 | 25000 | 25000 | 23000 | 24000 | 21000 |
| | Mw | | 40000 | 52000 | 52000 | 39000 | 41000 | 43000 |

TABLE 3

| | | Concentration (mass %) | Preparation Example | |
|---|---|---|---|---|
| | | | (7a) | (8a) |
| Amount (g) | Monomer C60LF | 100 | 4 | 0.8 |
| | VAC | 100 | 396 | 399 |
| | Medium Methanol | 100 | 600 | 600 |
| | Polymerization initiator DBPO | 100 | 1.33 | 1.33 |
| Molar ratio | C60LF | | 0.25 | 0.05 |
| | VAC | | 99.75 | 99.95 |
| Polymer | Yield (g) | | 283 | 320 |
| | Conversion rate [%] | | A | A |
| | Polymer name | | (FV7) | (FV8) |
| | Molecular weight Mn | | 51000 | 57000 |
| | Mw | | 82000 | 90000 |

The treating solutions were applied to bleached non-sized paper having a basis weight of 40 g/m² by bar coating, and the paper was allowed to stand at room temperature over night to evaporate the mixed medium in the treating solutions, and the paper was dried at 105° C. for 60 seconds.

Ex. 13 to 15

Polymer (8b) was dispersed in water to prepare treating solutions having the concentrations in the row for Ex. 13 to 15 in Table 5.

The treating solutions were applied to bleached non-sized paper having a basis weight of 40 g/m² by bar coating, and the paper was dried at 105° C. for 60 seconds.

TABLE 4

| | Saponification conditions | | | | Saponified polymer | | | | | | | | |
|---|---|---|---|---|---|---|---|---|---|---|---|---|---|
| Preparation Example | Unsaponified polymer | Reaction time | NaOH concentration [wt %] | Saponification degree [%] | Polymer | Molecular weight Mn | Mw | Molar ratio Units a | Units b | Units c | a/(a+b) mol % | b/(b+c) mol % | Solubility AK225/THF | Water |
| (1b) | (FV1) | 24 h | 20 | 100 | (1b) | 20000 | 31000 | 40 | 60 | 0 | 40 | 100 | A | C |
| (2b) | (FV2) | 24 h | 20 | 100 | (2b) | 21000 | 40000 | 33 | 67 | 0 | 33 | 100 | A | C |
| (3b-1) | (FV3) | 45 min | 20 | 75 | (3b-1) | 22000 | 41000 | 33 | 50 | 17 | 40 | 75 | A | C |
| (3b-2) | (FV3) | 45 min | 5 | 40 | (3b-2) | 24000 | 42000 | 33 | 27 | 40 | 55 | 40 | A | C |
| (4b) | (FV4) | 24 h | 20 | 100 | (4b) | — | — | 25 | 75 | 0 | 25 | 100 | B | C |
| (5b) | (FV5) | 24 h | 20 | 100 | (5b) | — | — | 20 | 80 | 0 | 20 | 100 | C | C |
| (6b) | (FV6) | 24 h | 20 | 100 | (6b) | — | — | 11 | 89 | 0 | 11 | 100 | C | C |
| (7b) | (FV7) | 50 min | 10 | 81 | (7b) | — | — | 0.25 | 81.20 | 18.55 | 0.3 | 81 | C | C |
| (8b) | (FV8) | 50 min | 10 | 96 | (8b) | — | — | 0.05 | 95.75 | 4.20 | 0.05 | 96 | C | A |
| (1a) | (FV1) | No saponification | | | (FV1) | 23000 | 40000 | 40 | 0 | 60 | — | 0 | A | C |
| (9a) | (FV9) | No saponification | | | (FV9) | 21000 | 38000 | — | — | — | — | — | A | C |
| — | EVAL | — | | | EVAL | — | — | — | — | — | — | — | A | A |

Ex. 1 to 12

Polymers (1b), (2b), (3b-1) and (3b-2) were dissolved in a mixed medium comprising AK-225 and THF in a volume ratio of 1/1 to prepare treating solutions having the concentrations shown in the rows for Ex. 1 to 12 in Table 5.

Ex. 16 to 18

Polymer (FV1) was dissolved in a mixed medium comprising AK-225 and THF in a volume ratio of 1/1 to prepare treating solutions having the concentrations in the row for Ex. 16 to 18 in Table 5.

The treating solutions were applied to bleached non-sized paper having a basis weight of 40 g/m² by bar coating, and the paper was allowed to stand at room temperature over night to evaporate the mixed medium in the treating solutions, and the paper was dried at 105° C. for 60 seconds.

Ex. 19 to 21

5 parts by mass of polyvinyl alcohol (Kuraray Poval PVA-117, manufactured by KURARAY Co., Ltd.) (hereinafter referred to as "PVA") was stirred with 95 parts by mass of water, while the temperature was raised to 95° C., then kept at 95° C. for 1 hour and lowered to room temperature, to obtain a 5 mass % PVA aqueous solution.

The PVA solution was diluted with water to the concentrations shown in the column "PVA Pretreatment" in Table 5 to prepare pretreatment solutions. The pretreatment solutions were applied to bleached non-sized paper having a basis weight of 40 g/m² by bar coating so that PVA was picked up by the paper in the amounts shown in the column "Amount" in Table 5. Then, the paper was dried at 105° C. for 60 seconds.

Polymer (FV1) was dissolved in a mixed medium comprising AK-225 and THF in a volume ratio of 1/1 to prepare treating solutions having the concentrations in the row for Ex. 19 to 21 in Table 5.

The treating solutions were applied to the PVA-pretreated paper by bar coating, and the paper was allowed to stand at room temperature over night to evaporate the mixed medium in the treating solutions, and the paper was dried at 105° C. for 60 seconds.

Ex. 22 to 24

Polymer (FV9) was dissolved in a mixed medium comprising AK-225 and THF in a volume ratio of 1/1 to prepare treating solutions having the concentrations in the row for Ex. 22 to 24 in Table 5.

The treating solutions were applied to bleached non-sized paper having a basis weight of 40 g/m² by bar coating, and the paper was allowed to stand at room temperature over night to evaporate the mixed medium in the treating solutions, and the paper was dried at 105° C. for 60 seconds.

Ex. 25 to 27

5 parts by mass of EVAL was stirred with 95 parts by mass of water, while the temperature was raised to 95° C., then kept at 95° C. for 1 hour and lowered to room temperature, to obtain a 5 mass % EVAL aqueous solution.

The EVAL aqueous solution was diluted with water to the concentrations shown in Table 5 to obtain treating solutions.

The treating solutions were applied to bleached non-sized paper having a basis weight of 40 g/m² by bar coating, and the paper was dried at 105° C. for 60 seconds.

The polymer content (g/m²) and the fluorine content (g/m²), the water resistance and the oil resistance of the treated papers in Ex. 1 to 27 are shown in Table 5.

TABLE 5

| | | PVA pretreatment | | Treating solution | Treated Paper | | | |
| | | | | | Content | | Water | |
| Ex. | Polymer | Concentration g/m² | Amount g/m² | Concentration mass % | Polymer g/m² | F g/m² | resistance s | Oil resistance |
|---|---|---|---|---|---|---|---|---|
| 1 | (1b) | — | — | 0.3 | 0.14 | 0.08 | 4 | 6 |
| 2 | | | | 0.8 | 0.32 | 0.19 | 12 | 8 |
| 3 | | | | 1.2 | 0.65 | 0.39 | 13 | 9 |
| 4 | (2b) | — | — | 0.3 | 0.22 | 0.12 | 7 | 6 |
| 5 | | | | 0.8 | 0.34 | 0.19 | 11 | 9 |
| 6 | | | | 1.2 | 0.64 | 0.37 | 13 | 10 |
| 7 | (3b-1) | — | — | 0.3 | 0.18 | 0.10 | 3 | 5 |
| 8 | | | | 0.8 | 0.30 | 0.16 | 10 | 7 |
| 9 | | | | 1.2 | 0.63 | 0.34 | 10 | 7 |
| 10 | (3b-2) | — | — | 0.3 | 0.18 | 0.09 | 1 | 3 |
| 11 | | | | 0.8 | 0.33 | 0.17 | 4 | 5 |
| 12 | | | | 1.2 | 0.66 | 0.34 | 7 | 6 |
| 13 | (8b) | — | — | 0.3 | 0.16 | — | 0 | 0 |
| 14 | | | | 0.8 | 0.38 | — | 0 | 0 |
| 15 | | | | 1.2 | 0.63 | — | 0 | 0 |
| 16 | FV1 | — | — | 0.3 | 0.13 | 0.06 | 0 | 3 |
| 17 | | | | 0.8 | 0.30 | 0.14 | 1 | 4 |
| 18 | | | | 1.2 | 0.63 | 0.30 | 5 | 5 |
| 19 | FV1 | 0.04 | 0.02 | 0.3 | 0.15 | 0.07 | 0 | 3 |
| 20 | | 0.11 | 0.06 | 0.8 | 0.31 | 0.15 | 4 | 5 |
| 21 | | 0.17 | 0.09 | 1.2 | 0.66 | 0.31 | 6 | 6 |
| 22 | FV9 | — | — | 0.3 | 0.18 | 0.10 | 0 | 0 |
| 23 | | | | 0.8 | 0.32 | 0.17 | 1 | 0 |
| 24 | | | | 1.2 | 0.67 | 0.36 | 3 | 0 |
| 25 | EVAL | — | — | 0.3 | 0.16 | — | 0 | 0 |
| 26 | | | | 0.8 | 0.38 | — | 0 | 0 |
| 27 | | | | 1.2 | 0.63 | — | 0 | 0 |

Polymers (1b), (2b) and (3b-1) used in Ex. 1 to 9 were soluble in the liquid medium, and the papers treated with them showed good water and oil resistance.

In Ex. 10 to 12, papers treated with polymer (3b-2) wherein the ratio of units b to the sum of units b and units c (saponification degree) was lower than 45 mol %, showed poor water and oil resistance.

Polymers (4b) to (7b) comprising from 0.25 to 25 mol % of units a were insoluble in both the mixed medium comprising AK-225 and THF, and water.

In Ex. 13 to 15, although polymer (8b) comprising 0.05 mol % of units a was soluble in water, the treated papers showed poor water and oil resistance.

In Ex. 16 to 18, papers treated with polymer (FV1) comprising no units b showed poor water and oil resistance.

In Ex. 19 to 21, the water and oil resistance was better than in Ex. 16 to 18 owing to the PVA pretreatment, but was still worse than in Ex. 1 to 9.

In Ex. 22 to 24, although polymer (FV9) comprising TFE units instead of units a was soluble in the mixed medium comprising AK-225 and THF, the treated papers showed poor water and oil resistance.

In Ex. 25 to 27, the papers treated with fluorine-free EVAL showed poor water and oil resistance.

INDUSTRIAL APPLICABILITY

The polymer of the present invention and a composition comprising it are useful as an water- and oil-proofing agent, a surface treatment for glass, resin products and the like, a water and oil repellent, an antifouling agent, a release agent and the like.

The water- and oil-proof paper of the present invention is useful as food packaging, food wrapping, an antifouling sheet and the like.

This application is a continuation of PCT Application No. PCT/JP2020/010649, filed on Mar. 11, 2020, which is based upon and claims the benefit of priority from Japanese Patent Application No. 2019-061569 filed on Mar. 27, 2019. The contents of those applications are incorporated herein by reference in their entireties.

What is claimed is:

1. A polymer comprising the following units a, and at least the following units b selected the following units b and the following units c, wherein the ratio of units a to all the units in the polymer is from 28 to 70 mol %, the total ratio of units b and units c to all the units in the polymer is from 30 to 72 mol %, and the ratio of units b to the sum of units b and units c is at least 45 mol %:

units a: units represented by the following formula 1

$$-(CH_2-CHR^f)- \qquad \text{formula 1}$$

wherein $R^f$ is a $C_{1-8}$ perfluoroalkyl group, units b: units represented by the following formula 2

$$-(CH_2-CH(OH))- \qquad \text{formula 2}$$

units c: units represented by the following formula 3

$$-(CH_2-CH(OC(=O)R))- \qquad \text{formula 3}$$

wherein R is a $C_{1-4}$ alkyl group.

2. The polymer according to claim 1, wherein the ratio of units a to the sum of units a and units b is from 20 to 70 mol %.

3. The polymer according to claim 1, which has a number average molecular weight of at least 9,000.

4. A water- and oil-proofing composition comprising the polymer as defined in claim 1 and a liquid medium.

5. The water- and oil-proofing composition according to claim 4, which is used for paper.

6. An article treated with the water- and oil-proofing composition as defined in claim 4.

7. Water- and oil-proof paper comprising the polymer as defined in claim 1.

8. The water- and oil-proof paper according to claim 7, having a fluorine content of from 0.01 to 2.0 g/m².

* * * * *